(12) United States Patent
Fuduloff

(10) Patent No.: US 9,976,588 B2
(45) Date of Patent: May 22, 2018

(54) TOILET FLUSHING APPARATUS LOCKING NUT SYSTEM

(71) Applicant: Gary D. Fuduloff, Palm City, FL (US)

(72) Inventor: Gary D. Fuduloff, Palm City, FL (US)

(*) Notice: Subject to any disclaimer, the term of this patent is extended or adjusted under 35 U.S.C. 154(b) by 0 days. days.

(21) Appl. No.: 15/173,769

(22) Filed: Jun. 6, 2016

(65) Prior Publication Data

US 2017/0350439 A1    Dec. 7, 2017

(51) Int. Cl.
*E03D 5/00* (2006.01)
*F16B 39/06* (2006.01)
*E03D 5/09* (2006.01)

(52) U.S. Cl.
CPC ............... *F16B 39/06* (2013.01); *E03D 5/09* (2013.01)

(58) Field of Classification Search
CPC ...................................... E03D 5/092
USPC ........................................ 4/405–409
See application file for complete search history.

(56) References Cited

U.S. PATENT DOCUMENTS

| 4,447,919 A  * | 5/1984  | Mobilia   | E03D 1/144 4/325 |
| 5,465,432 A  * | 11/1995 | Miller    | E03D 1/144 4/325 |
| 5,483,706 A  * | 1/1996  | Tsai      | E03D 1/144 4/325 |
| 2007/0256224 A1* | 11/2007 | Olshausen | E03D 5/092 4/405 |

* cited by examiner

*Primary Examiner* — Lori Baker

(57) ABSTRACT

A Toilet Flushing Apparatus Locking Nut System characterized by affixing a rigid rod to a securing nut that contains multiple rod receiving holes. The locking nut system maintains a secured position by means of resistance created when the rod contacts the toilet flushing apparatus's lifting arm, preventing rotational movement of the securing nut to less than 360 degrees. Multiple rod receiving holes within the body of the securing nut afford the ability to adjust the rod's position—to further reduce the securing nut's rotation travel to less than 360 degrees.

6 Claims, 4 Drawing Sheets

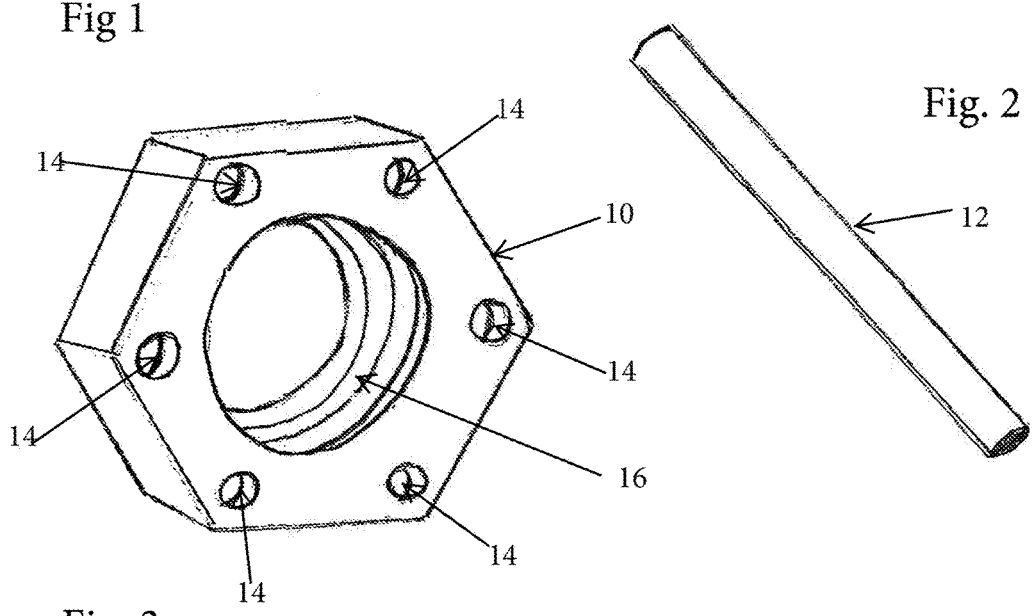
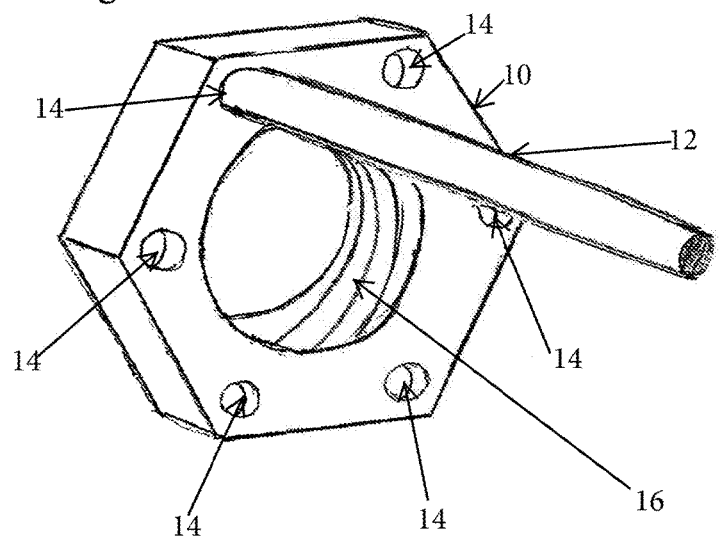

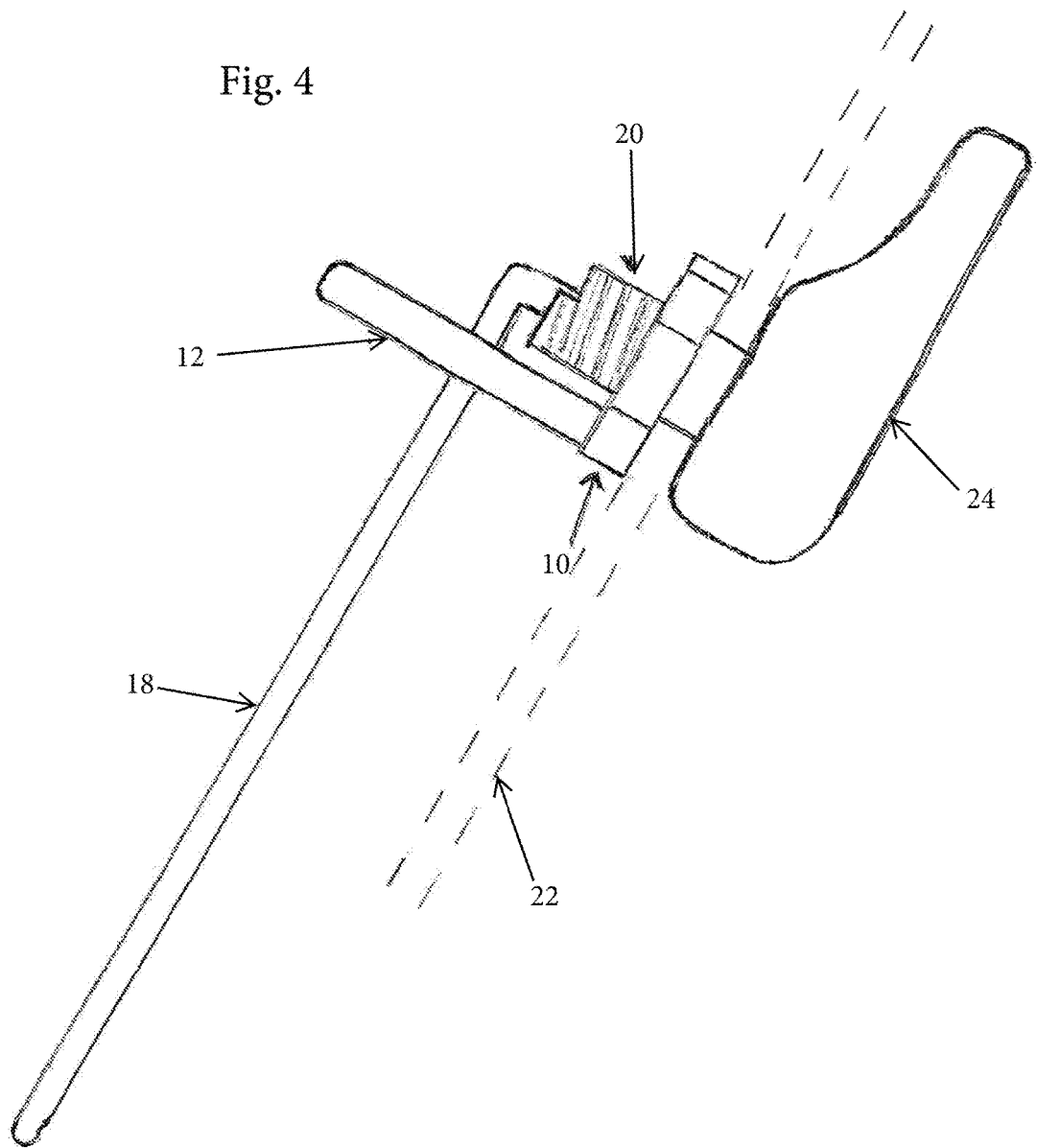

1

TOILET FLUSHING APPARATUS LOCKING NUT SYSTEM

BACKGROUND

New and existing toilets employ a mechanical, manually activated flushing lever. Said flushing apparatus consist of (but not limited to) a flush handle, a threaded sleeve connected to the flush handle, a rod or "lever arm" attached solidly or directly connected to the flush handle, and an independent securing nut (received by said threaded sleeve).

The rod end or "lever arm" of the mechanism and the threaded sleeve are inserted through a hole in the wall of the toilet (water reservoir) tank to a stopping point where the flushing handle remains on the outer body of the toilet tank.

The threaded sleeve receives a nut to secure said flushing apparatus to the toilet reservoir tank. When activated, the flush handle, threaded sleeve, and lever arm move in unison, while the tank securing nut remains stationary.

Assembled, the securing nut maintains position (tight), whereby, securing all other components of said flushing apparatus. It is essential that the flushing mechanism remains in its' designed and assigned location during operation for this apparatus to function properly and efficiently. Other measured parts (included, but not exclusively, the flapper connected to the lever arm) rely on this mechanism's designed position for complete functionality of the flushing cycle.

The securing nut's position is maintained by the physical relationship created between the threads of the bolt and the grooves of the nut, and by the pressure exerted on the nut securely contacting the interior wall of the tank.

When activated, the flush handle and threaded sleeve rotate in one direction (usually, but not exclusively, downward), as to cause the connected or continuous internal lever arm to raise. As the lever arm raises, a connecting mechanism (usually a chain, but, not exclusively) attached to a flapper, raises to release water through an opening- and in to the toilet bowl. The flush handle then rotates in reverse direction (usually, but, not exclusively, upward) to its' original position, allowing the lever arm to lower, allowing the flapper to lower- and re-seal the opening. This permits water to refill the securely sealed reservoir tank to the desired level-making the toilet ready for its' next cycle of use.

Technical Problem

Failure and inefficiency in the toilet flushing and reservoir re-filling process occurs when the flushing apparatus's components are misaligned, become unsecured, and deviate from their intended position. Relating to the flushing apparatus, this failure occurs due to a loosening of the flushing apparatus's securing nut not remaining stationary (tightly secured).

Continually maintaining the position of this securing nut through use of the flushing lever mechanism, permits proper flushing functionality. When the securing nut deviates from its' intended (tight) position (and becomes loose), consequently, the flush handle, threaded sleeve, and lever arm also deviate from their intended, functionally necessary positions. As a result of these deviations, compromised success of the aforementioned complete flushing process occurs.

A compromised or failure of the flushing procedure can cause (but is not limited to) the toilet flapper connected to the flushing arm, to not lower, close properly, or entirely. The resulting effect (but not limited to); the condition of the toilet reservoir tank not reaching (or delaying) the desired water level, failing to shut-off, and complete the reservoir tank refilling process (toilet continues to run).

As a result of the internal securing nut becoming loose and flushing apparatus deviating from its' intended position, the flushing handle's (external to the tank) rotational movement can be hindered from its' designed travel path (but not limited to), hindering operational success. A loose or unsecure toilet nut can also create unintended or unwanted mechanical noise Giggling sound).

In an attempt to remedy the existing loosening condition, the nut designed to secure the flushing arm and handle is commonly "over-tightened." This "over-tightening" can result in a binding effect of the flushing apparatus. This restriction creates a failure or hindrance of proper and successful lever and handle movement, and component travel necessary for successful completion of the flushing procedure.

During use, generally accepted conditions arise (such as; but not limited to); corrosion between the threaded sleeve and securing nut that permits the securing nut to incorrectly move in rotational unison with the flush handle and threaded component of the flushing apparatus. This condition results in the nut loosening (un-threading) from the toilet wall releasing the previous held tension/pressure necessary to secure the flushing apparatus. When the tension/pressure between the nut and toilet tank have been released, subsequent rotational handle flushing motions can further continue the securing nut's movement in the opposite direction of the tightening direction.

Technical Solution

Employing the locking nut and rod system minimizes rotational travel of the toilet flushing apparatus's securing nut to less than 360 degrees. Limiting the rotational travel of the securing nut to less than 360 degrees prevents the toilet flushing apparatus from becoming loose, unsecured, and malfunctioning.

SUMMARY

A locking nut and rod system, that when incorporated with a toilet flushing apparatus, prevents the flushing apparatus from becoming unsecure (loose) from its' intended, functional position(s).

A problem in the successful operation of the toilet flushing procedure exists when a nut designed to securely affix the flushing mechanism to toilet (tank wall) becomes unsecure. This problem is resolved by inserting a rod (end of said rod) in to a securing nut after the nut is threaded on and tightened to the flushing mechanism. The rod is rigid. The rod's opposite end (or body) of said rod is positioned against (or in close proximity) to the flushing mechanism's lifting arm.

As the nut and rod are now securely connected (one piece), contact between the rod and flushing mechanism's lifting arm creates resistance preventing rotational movement of the nut (unthread) to less than 360 degrees, ensuring the flushing mechanism remains secured. Multiple rod receiving holes on the nut allow the rod to be positioned to further limit the nut's rotational travel to less than 360 degrees. When installed, the locking nut system does not hinder the functionality of the flushing mechanism.

DESCRIPTION OF THE DRAWINGS

The toilet flush locking nut system is created when the following components are assembled and positioned as illustrated.

FIG. 1

A Nut that (by multiple designs) can utilize varying material compositions, varying thread configurations, varying thread directions, varying external diameter shapes, varying heights, and varying internal (threaded hole) diameters. The nut contains multiple holes at multiple locations exterior to the center threaded hole of the nut interior to the edge(s) of the nut. All holes of the nut are parallel to the center threaded hole.

FIG. 2—Locking Rod

A rod (that by multiple design) can utilize varying diameters, varying lengths, varying material compositions, maintain variable levels of rigidity, but, is rigid in nature. FIG. 3—Completed Assembly Demonstrates Locking Rod (FIG. 2) inserted in one of the perimeter holes of Nut (FIG. 1). Locking Rod (FIG. 2) is securely fashioned inside one of the available perimeter holes of the nut (FIG. 1) by known connecting fashions (included but not limited to); threading, compression, or adhesion. Locking Rod (FIG. 2) can be received in all perimeter exterior holes of the nut (FIG. 1).

FIG. 4—Toilet Flushing Apparatus with Installed Locking Nut System

Demonstrates the top (or underside view) view of a toilet flushing handle apparatus with the completed Locking Nut System in place-containing the Nut (FIG. 1) and Locking Rod (FIG. 2). FIG. 4 demonstrates the positioning of the Nut (FIG. 1) with Locking Rod (FIG. 2) in close proximity to the Lifting Arm.

Figure 5:
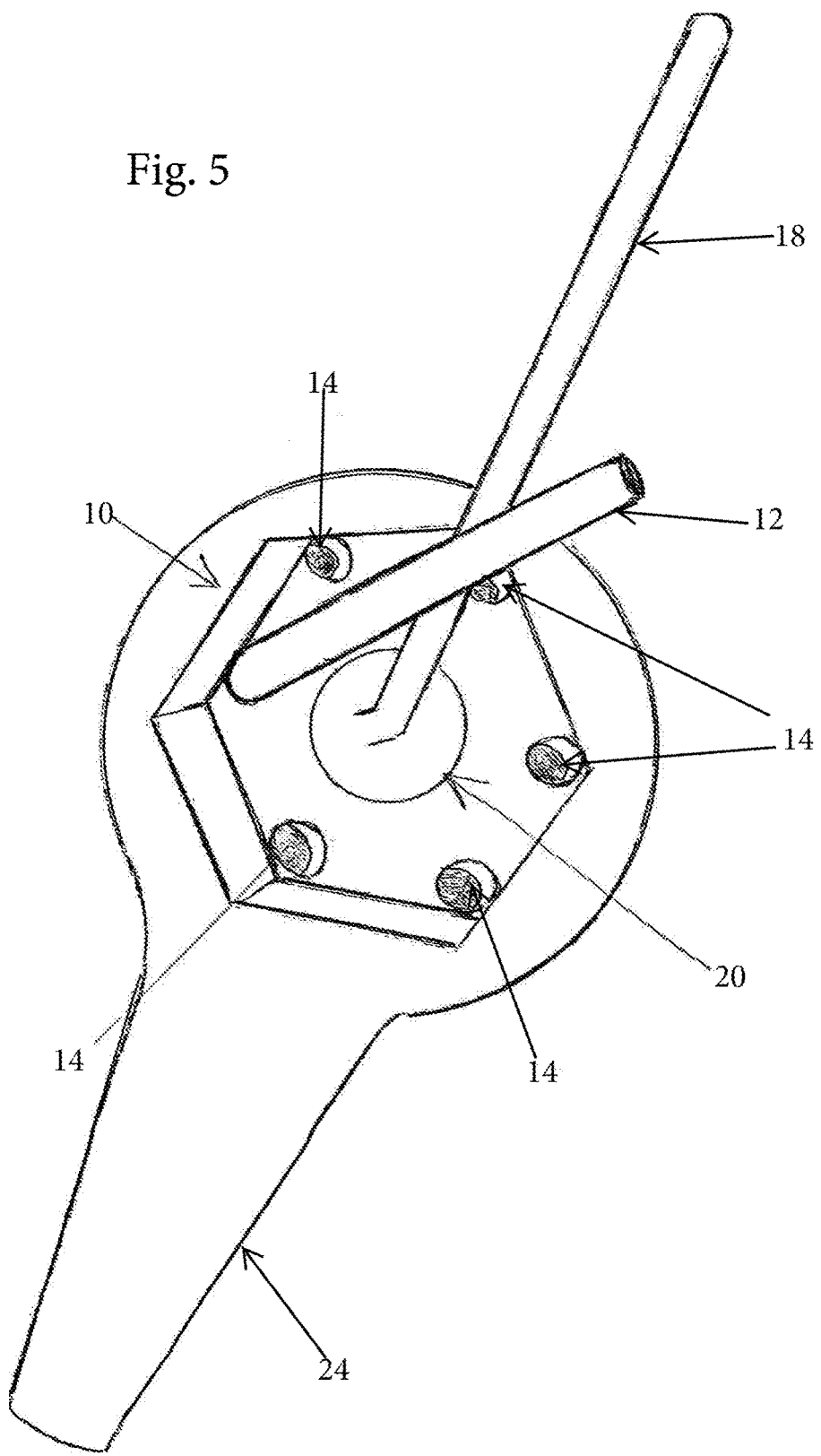

FIG. 5—Interior View 3D

Demonstrates an interior view of the Nut (FIG. 1) with Locking Rod (FIG. 2) assembled to the toilet flushing apparatus. FIG. 5 demonstrates the positioning of the Nut (FIG. 1) installed on to the flushing apparatus with the Locking Rod (FIG. 2) in close proximity to the Lifting Arm.

Figure 6:
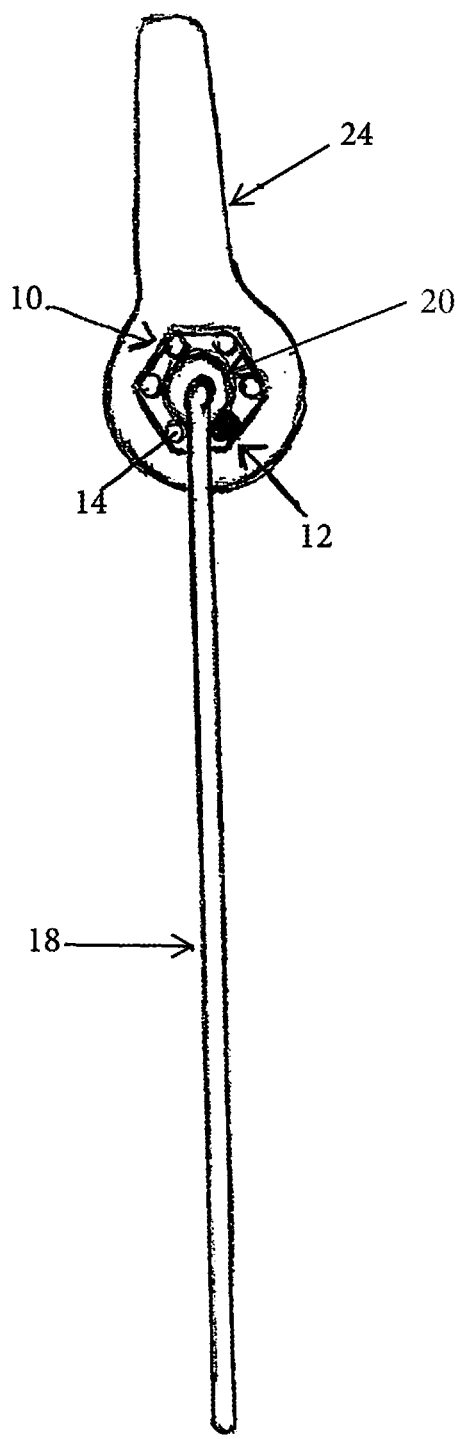

FIG. 6—2D Interior Side View

Demonstrates the 2D interior side-view of the completed Locking Nut System incorporated with the toilet flushing apparatus. The blackened circle located on the perimeter of the Nut (FIG. 1) demonstrates the assembled position of the Locking Rod (FIG. 2) in dose proximity to the Lifting Arm.

DETAILED DESCRIPTION

The toilet flush mechanism locking nut system contains two separate components. The two components are; a threaded nut 10 and a rod 12. The nut 10 displays the distinct characteristics of having the ability to affix said rod 12 securely to itself by a receiving hole(s) 14. The nut 10 may be configured in various manners and dimensions as to accommodate various flushing mechanism designs. Variations of the nut include (but, not limited to); material of the nut, thread size, thread direction, internal nut dimension, outer nut dimension, outer nut shape, and nut height.

The nut contains multiple rod receiving holes 14 positioned outside of the inner threaded hole 16, internal to the outer edge(s) of the nut. The multiple rod receiving holes 14 allow multiple adjustment positions of the rod 12 in relation to the lift arm 18 (having a threaded sleeve 20) when the nut is secured in place adjacent tank wall 22. These adjustment positions allow the locking nut system to accommodate various flushing mechanism designs (having a flush handle 24) and orientations and limit the rotational travel of the nut to less than 360 degrees. The depth and diameter of the rod receiving hole may vary as varying rod materials rigidity exists.

The rod affixed in the (a) receiving hole of the nut is rigid in nature and may be constructed from various materials. These materials are (but, not limited to); plastic, steel, aluminum, or polypropylene. The length of the rod may vary as to accommodate various flushing mechanism designs. The diameter of the rod may vary—as various rod materials rigidity characteristics exist. The consistent characteristic of the rod is its' ability to create resistance against the toilet flushing mechanisms lifting aim when contacted.

The connecting method of the nut and rod may vary. The connection method of the rod and nut are (but, not limited to); a threaded rod end inserted to a threaded rod receiving hole in the nut, a compression relationship, or adhesion. The aforementioned variations of the nut and rod system are necessary as to accommodate various toilet flushing mechanism designs.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A toilet flush assembly for attachment to a toilet tank and a flush handle having a lift arm comprising:
    a threaded nut having an outer edge and an inner threaded hole for receiving the lift arm, the nut including at least one outer hole located between the inner threaded hole and the outer edge of the nut; and
    a rod having a first end and a length;
    said at least one outer hole of the nut receiving the first end of the rod and forming a fixed connection therebetween such that rotational movement of the nut causes movement of the rod, the length of the rod when inserted into the outer hole extends into the toilet tank beyond the lift arm such that rotation of the nut causes the rod to make contact with the lift arm when the rotational movement of said nut is less than 360 degrees and such contact prevents further rotational movement of the nut.

2. The toilet flush assembly of claim 1 wherein the threaded nut includes at least two outer holes located between the inner threaded hole and the outer edge for receiving the rod in one of at least two positions of said nut, to prevent rotational movement of the nut to less than 360 degrees.

3. The toilet flush assembly of claim 2 wherein the nut includes six sides and has a hexagonal shape, and the inner threaded hole is centrally located in the hexagonal shape.

4. The toilet flush assembly of claim 3 wherein the nut includes six outer holes located between the inner threaded hole and the outer edge for receiving the rod in one of six positions to prevent rotational movement of the nut to less than 360 degrees.

5. The toilet flush assembly of claim 4 wherein the six outer holes are spaced evenly around the inner threaded hole.

6. The toilet flush assembly of claim 5 wherein the nut includes a surface that faces the interior of the toilet tank, the rod extending perpendicularly from the surface of the nut toward the interior of the toilet tank.

\* \* \* \* \*